United States Patent
Ohashi et al.

(10) Patent No.: US 6,723,170 B2
(45) Date of Patent: Apr. 20, 2004

(54) CRYSTALLINE TREHALOSE DIHYDRATE, ITS PREPARATION AND USES

(75) Inventors: Tetsuya Ohashi, Okayama (JP); Hiroto Chaen, Okayama (JP); Toshio Miyake, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 539 days.

(21) Appl. No.: 09/846,326

(22) Filed: May 2, 2001

(65) Prior Publication Data

US 2001/0033888 A1 Oct. 25, 2001

Related U.S. Application Data

(62) Division of application No. 09/349,103, filed on Jul. 8, 1999, now abandoned.

(30) Foreign Application Priority Data

Jul. 9, 1998 (JP) .............................. 10-194356

(51) Int. Cl.⁷ ................................. C13F 1/02
(52) U.S. Cl. ........................ 127/60; 127/29; 426/658; 426/660
(58) Field of Search ................ 127/60, 29; 426/658, 426/660

(56) References Cited

U.S. PATENT DOCUMENTS 5,441,644 A    8/1995   Kinochi
5,993,889 A  * 11/1999  Nakada et al. ............... 426/658

FOREIGN PATENT DOCUMENTS

| EP | 0 606 753 A2 | 7/1994 |
|----|--------------|--------|
| EP | 0 609 801 A1 | 8/1994 |
| EP | 0 628 630 A2 | 12/1994 |
| EP | 0 636 693 A2 | 2/1995 |
| EP | 0 691 344 A1 | 1/1996 |
| EP | 0 693 558 A1 | 1/1996 |
| JP | 58-216695 | 12/1983 |
| JP | 07-143876 | 6/1995 |
| JP | 07-170977 | 8/1995 |
| JP | 07-213283 | 8/1995 |
| JP | 07-246097 | 9/1995 |

OTHER PUBLICATIONS

Hoelzle, Inger et al., "Increased Accumulation Of Trehalose in Rhizobla Cultured Under 1% Oxygen.", Applied and Environmental Microbiology, ,vol. 56, No. 10 (Oct. 1990), pp. 3213–3215.

Samskog, P.O. et al., "An ESR Study Of 77 K Alkoxy And Hydroxyalkyl Radicals In X–Ray Irradiated Trehalose Single Crystals", J. Chem. Phys., vol. 77, No. 5, (Sep. 1982,) pp. 2330–2335.

Wolfrom, Melyville L., et al., Advances in Carbohydrate Chemistry. vol. 18, Academic Press Inc., New York, New York, (1963)*.

Ruland, W., "X–Ray Determination Of Crystallinity And Diffuse Disorder Scattering", Acta Cryst (1961), vol. 14, pp. 1180–1185.

* cited by examiner

*Primary Examiner*—David Brunsman
(74) *Attorney, Agent, or Firm*—Browdy and Neimark

(57) ABSTRACT

Disclosed are a crystalline trehalose dehydrate which has an elongated crystalline structure with a proportion of the length in the c axis to that in the b axis less than 2.0, its preparation and uses. The crystal has insubstantial hygroscopicity and solidification, and satisfactory stability, free-flowing ability, and handleability; it can be easily processed without fracture in the drying and sieving steps.

7 Claims, 3 Drawing Sheets

CRYSTALLINE TREHALOSE DIHYDRATE, ITS PREPARATION AND USES

REFERENCE TO OTHER APPLICATIONS

This is a division of parent application Ser. No. 09/349,103, filed Jul. 8, 1999, now abandoned.

BACKGROUND OF THE INVENTION

1. Field of the Invention

The present invention relates to a novel crystalline trehalose dihydrate, its process and uses, and more particularly to a novel crystalline trehalose dihydrate which has an elongated crystalline structure with a proportion of the length in the c axis to that in the b axis less than 2.0, its process and uses as compositions containing the crystal.

2. Description of the Prior Art

Trehalose or α,α-trehalose has been long known as a non-reducing saccharide composed of D-glucose units. As described in *Advances in Carbobydrate Chemistry*, Vol. 18, pp. 201–225 (1963), published by Academic Press, USA, and *Applied and Environmental Microbiology*, Vol. 56, pp. 3,213–3,215 (1990), trehalose widely exists in microorganisms, mushrooms, insects, etc., though the content is relatively low. Since non-reducing saccharides including trehalose do not react with amino-group-containing substances such as amino acids and proteins, they neither induce amino-carbonyl reaction nor deteriorate amino-acid-containing substances. Thus, the non-reducing saccharides have been recognized to be processed without fear of causing undesirable browning and deterioration, and their mass-productions have been in great demand.

Industrial-scale production of crystalline trehalose dihydrate has been realized, for example, by using in combination several enzymes, in particular, a non-reducing saccharide-forming enzyme, as disclosed in Japanese Patent Kokai No. 143,876/95, which forms a non-reducing saccharide having a trehalose structure as an end unit from one or more reducing partial starch hydrolysates with a glucose polymerization degree of at least three; and a trehalose-releasing enzyme, as disclosed in Japanese Patent Kokai No. 213,283/95, which specifically hydrolyzes the bonding between the part of a trehalose structure and the resting part of a non-reducing saccharide having a trehalose structure as an end unit and a glucose polymerization degree of at least three. *Journal of Chemical Physics*, Vol. 77, No. 5, pp. 2,330–2,335 (1982) reported the structure of crystalline trehalose dihydrate which has an orthorhombic structure as shown in FIG. 1, and has axes having different lengths and crossings at right angles, i.e., it has the a, b, and c axes, and which more elongates to the direction of the c axis than to the b axis, resulting in growth of an easily fragile slender shape of crystal. In fact, commercially available crystalline trehalose dihydrate has a rather slender shape as shown in FIG. 2, a microscopic photograph, where the proportion of the length to the direction of the c axis (the length to the direction of the c axis is abbreviated as the c axis throughout the specification, unless specified otherwise) to that of the b axis (the length to the direction of the b axis is abbreviated as the b axis throughout the specification, unless specified otherwise) is about 3.5 to about 5.5 folds and the c axis is about 2 mm at the longest. Commercially available crystalline trehalose dihydrate has a proportion of length to the direction of the c axis to that of the a axis (the length to the direction of the a axis is abbreviated as the a axis throughout the specification, unless specified otherwise) is about 8 to about 12 folds. The aforesaid conventional crystalline trehalose dihydrate is generally too large in surface area, resulting in the following drawbacks: It is not easily separated from molasses in the separation steps; it needs a relatively-large amount of drying energy; and it is easily fragile during the steps of drying and sieving. Moreover, conventional slender shape of crystalline trehalose dihydrate could not hardly process candy fluff using commercially available machines therefor and hardly be used to process alcoholic beverages with fruits such as ume brandy because the crystal easily dissolves in water. Unlike conventional crystalline trehalose dihydrate, greatly expected is the establishment of a crystalline trehalose dihydrate that can be easily separated and dried in its processing, free of fracture during the steps of drying and sieving, and arbitrarily used to produce candy fluffs and alcoholic beverages with fruits.

SUMMARY OF THE INVENTION

The present invention aims to establish crystalline trehalose dihydrate, that can be easily separated and dried in its processing and free of fracture during the steps of drying and sieving, and to provide its process and uses as compositions containing the crystal.

To overcome the above object, the present inventors eagerly studied on the relationship between the lengths of the axes c and b of a crystalline trehalose dihydrate, and found the conditions for growing such a crystal. As a result, they found that the above object is attained by growing a crystalline trehalose dihydrate having an elongated crystal structure with a proportion of the c axis to the b axis of less than 2.0, or preferably one having a proportion of the c axis to the b axis of less than 2.0, where the c axis is at least 3 mm.

The present inventors found that a crystalline trehalose dihydrate, that can be easily separated and dried in its processing and free of fracture during the drying and sieving steps, can be obtained by placing a supersaturated aqueous trehalose solution with a trehalose content of at least about 98 w/w % (the wording "w/w %" is abbreviated as "%" throughout the specification, unless specified otherwise), on a dry solid basis (d.s.b.) in terms of its anhydrous form, and coexisting crystalline trehalose dihydrate as a seed crystal while controlling the supersaturation degree to a level of less than 1.15 to grow the crystal; and they accomplished this invention by establishing the process and uses of the present crystalline trehalose dihydrate. The present invention achieves a crystalline trehalose dihydrate having an elongated crystalline structure with a proportion of the c axis to the b axis of less than 2.0, and reaches the above object by establishing the process and uses as compositions containing the crystal.

BRIEF DESCRIPTION OF THE ACCOMPANYING DRAWINGS

Figure 4:
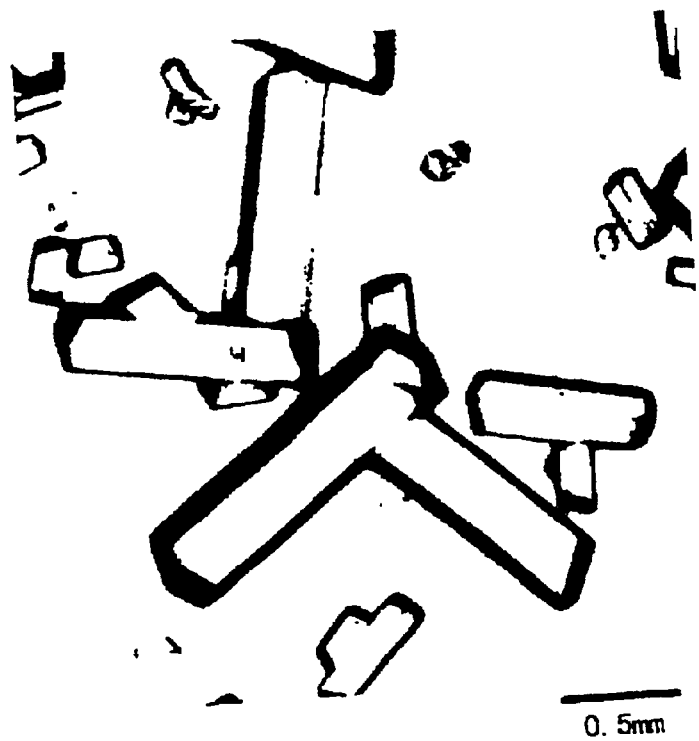
Figure 5:
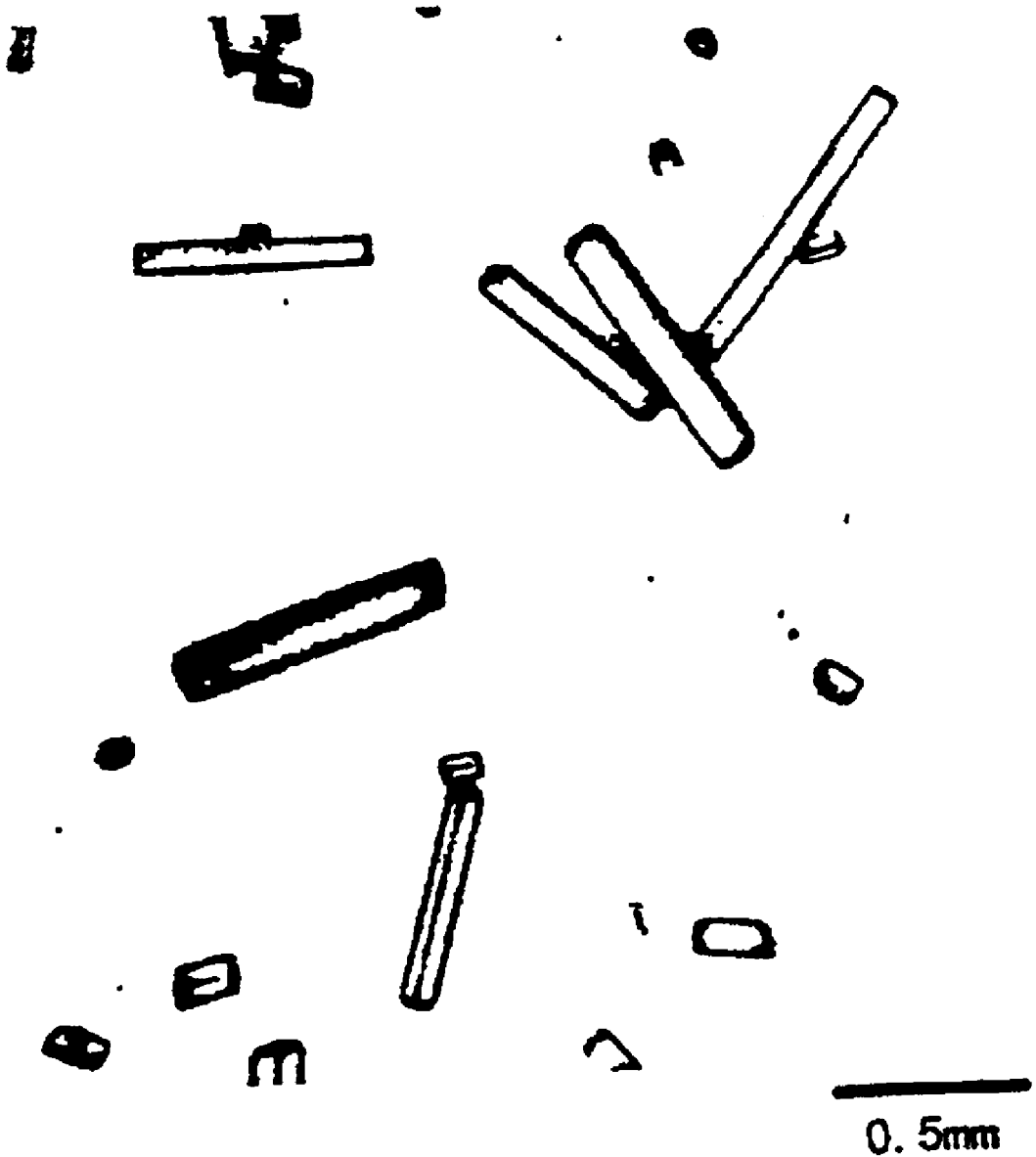

FIG. 4 is an intermediate tone view of a microscopic photograph of a crystalline trehalose dihydrate, grown in a supersaturated aqueous solution with a trehalose content of 83.3%, displayed on a display FIG. 5 is an intermediate tone view of a microscopic photograph of a crystalline trehalose dihydrate, grown in a supersaturated aqueous solution with a trehalose content of 68.1%, displayed on a display.

DETAILED DESCRIPTION OF THE INVENTION

The characteristics of the present invention are as follows:
(1) The present crystalline trehalose dihydrate has an elongated crystalline structure with a proportion of the length in the c axis to that in the b axis of less than 2.0;
(2) A process for producing the crystalline trehalose dihydrate, characterized in that it comprises the steps of placing in a crystallizer a supersaturated aqueous trehalose solution with a trehalose concentration of at least about 98 w/w %, d.s.b.;
coexisting a crystalline trehalose dihydrate as a seed crystal; growing the seed crystal by cooling the mixture gradually to control the supersaturation degree to a level of less than 1.15; and separating and drying the mixture to collect the grown crystalline trehalose dihydrate; and
(3) A process for producing a composition, characterized in that it comprises a step of incorporating the present crystalline trehalose dehydrate into a material product to be incorporated with the crystal.

Any trehalose can be used in the present invention independently of its origin and property as long as the present crystalline trehalose dihydrate can be obtained therewith. For example, any one of the following trehaloses can be arbitrarily used in the present invention; A trehalose from yeasts obtained by the extraction method as disclosed in Japanese Patent Kokai No. 246,097/95, one from maltose produced by the phosphorylase method as disclosed in Japanese Patent Kokai No. 216,695/83, and one from starches prepared by the enzymatic saccharification methods as disclosed in Japanese Patent Kokai Nos. 170,977/95 and 213,283/95. Commercially available high-purity crystalline trehalose dihydrates and high-purity crystalline trehalose anhydrides can be also used in the present invention. For example, "TREHAOSE®", a high-purity crystalline trehalose powder commercialized by Hayashibara Shoji, Inc., Okayama, Japan, can be advantageously used. The saccharides used for the supersaturated aqueous solutions, in which the present crystalline trehalose dihydrate is allowed to grow, are preferably those which contain the highest possible amount of trehalose, usually those with at least about 98%, preferably at least about 98.5 to about 99.9%, d.s.b.

To make uniform the size of the present crystalline trehalose dihydrate as much as possible, a crystalline trehalose dihydrate to be coexisted as a seed crystal is allowed to grow while inhibiting the formation of minute crystals as much as possible. The preferable conditions are as follows: A preferable crystalline trehalose dihydrate is allowed to grow by keeping the supersaturation degree of a supersaturated aqueous trehalose solution to a level of less than 1.15, and preferably less than 1.10. The temperature of the supersaturated aqueous trehalose solution should preferably be set to those which are substantially free from bacterial contamination and low in energy consumption and cost in heating, cooling, heat-keeping/insulating steps, etc.; generally, those from about 20 to about 90° C., and preferably those from about 30 to about 80° C.

The crystalline trehalose dihydrate used as a seed crystal in the present invention should preferably be those which have the highest possible content of trehalose. If necessary, such a crystal can be powdered or pulverized before use, and the resulting powdered or pulverized crystal is preferably sieved into those in a uniform size as much as possible. The amount of the seed crystal preferably used in the present invention is from about 0.01 to about 20%, and preferably from about 0.1 to about 10%, d.s.b.

The process for producing the crystalline trehalose dihydrate according to the present invention is disclosed as follows in more detail:

A supersaturated aqueous trehalose solution is placed in a crystallizer, preferably in a cylindrical rotatory crystallizer, allowed to admix with a crystalline trehalose dihydrate as a seed crystal, and cooled gradually under gentle stirring- and rotatory-conditions to keep the supersaturation degree to a level of less than 1.15, and preferably 1.10 or lower, in order to grow the seed crystal into an elongated crystalline trehalose dihydrate having a proportion of the length in the c axis to that in the b axis of less than 2.0, preferably 0.5 to 1.9, and more preferably 0.6 to 1.8; a proportion of the length in the c axis to that in the a axis of less than 5.0, preferably 1.5 to 4.5; a length of the c axis of at least 3 mm, and preferably about 4 to 50 mm; and a deca- to icosa-hedral crystalline structure, and preferably dodeca- to octodecimo-hedral crystalline structure. Then the resulting crystals are separated by filtration or centrifugation. In the separation step, if necessary, a small amount of water or an aqueous trehalose solution can be sprayed over the crystals to wash the surface of the crystals. Thereafter, the resulting crystals are dried, and if necessary further sieved into desired products. The crystalline trehalose dihydrate having an elongated crystalline structure with a proportion of the length in the c axis to that in the b axis of less than 2.0, formed by growing a seed crystal in the supersaturated trehalose solution, can be easily separated and dried in its processing. The resulting crystalline trehalose dihydrate is substantially free from fracture during the drying and sieving steps and is a stable polyhedral crystalline trehalose dihydrate that well keeps the form and structure of the grown crystal. The present crystalline trehalose dihydrate thus obtained does not substantially cause solidification by absorbing moisture and has a satisfactory free-flowing ability and handleability. These features can minimize the physical- and labor-costs needed for the control and management of packages, transportations, storages, etc., of the crystal.

The present crystalline trehalose dihydrate has the properties of trehalose per se such as waster solubility, low sweetness, body-imparting ability, gloss-imparting ability, moisture-retaining ability, viscosity, stability, heat tolerance, acid tolerance, retrogradation-preventing ability for starches, energy-imparting ability, insubstantial fermentability, low-cariogenicity, etc. With these satisfactory properties, the present crystalline trehalose dihydrate can be arbitrarily used to produce compositions such as food products, cosmetics, pharmaceuticals, and shaped bodies.

When used as a sweetener, the present crystalline trehalose dihydrate can be used either intact or after pulverized together with adequate amounts of one or more other sweeteners, for example, powdered syrup, glucose, maltose, sucrose, isomerized sugar, sucrose, honey, maple sugar, sorbitol, xylitol, lactitol, maltitol, dihydrocharcone, stevioside, α-glycosyl stevioside, sweetener from *Fructus Momordicae*, glycyrrhizin, L-aspartyl L-phenylalanine methyl ester, sucralose, ACESULFAME K, saccharin, glycine, and alanine; and/or a filler such as dextrins, starches and lactose.

The present crystalline trehalose dihydrate is in a solid form substantially free from hygroscopicity; it can be used either intact or after colored, flavored and pulverized to prepare easily sweeteners, candy fluffs, buns, breads, bakeries, cookies, wafers, chocolates, chewing gums, instant juices, instant soups, alcoholic beverages with fruits, liquors, granules, tablets, etc.

The present crystalline trehalose dihydrate can be also used intact or, if necessary, after pulverized as an excipient, filler, binder, etc., in the form of spheres, rod-shapes, plates, cubes, etc.

The present crystalline trehalose dihydrate well harmonizes with other materials having sour-, acid-, salty-, bitter-, delicious-, and astringent-tastes, and has a relatively-high acid- and heat-tolerances. Thus, it can be favorably used in food products in general as a sweetener, taste-improving agent, and quality-improving agent.

The present crystalline trehalose dihydrate can be used as a sweetener, taste-improving agent, or quality-improving agent in seasonings such as a soy sauce, powdered soy sauce, "miso", "funmatsu-miso" (a powdered miso), "moromi" (a refined sake), "hishio" (a refined soy sauce), "furikake" (a seasoned fish meal), mayonnaise, dressing, vinegar, "sanbai-zu" (a sauce of sugar, soy sauce and vinegar), "funmatsu-sushi-su" (powdered vinegar for sushi), "chuka-no-moto" (an instant mix for Chinese dish), "tentsugu" (a sauce for Japanese deep-fat fried food), "mentsugu" (a sauce for Japanese vermicelli), sauce, catsup, "yakiniku-notare" (a sauce for Japanese grilled meat), curry roux, instant stew mix, instant soup mix, "dashi-no-moto" (an instant stock mix), nucleic acid condiments, mixed seasoning, "mirin" (a sweet sake), "shin-mirin" (a synthetic mirin) table sugar, and coffee sugar.

Also, the present crystalline trehalose dihydrate can be arbitrarily used as a sweetener, taste-improving agent or quality-improving agent in food products including "wagashi" (Japanese cakes) such as "senbei" (a rice cracker), "arare-mochi" (a rice-cake cube), "okoshi" (a millet-and-rice cake), "mochi" (a rice paste), "manju" (a bun with a bean-jam), "uiro" (a sweet rice jelly), "an" (a bean jam), "yokan" (a sweet jelly of beans), "mizu-yokan" (a soft adzuki-bean jelly), "kinggoku" (a kind of yokan), jelly, pao de Castella, "amedama" (a Japanese toffee), and spun sugar; confectioneries such as bun, biscuit, cracker, cookie, pie, pudding, butter cream, custard cream, cream puff, waffle, sponge cake, doughnut, chocolate, chewing gum, caramel, and candy; frozen desserts such as an ice cream and sherbet; syrups such as a "kajitsu-no-syrup-zuke" (a preserved fruit) and "korimitsu" (a sugar syrup for shaved ice); pastes such as a flour paste, peanut paste, fruit paste and spread; processed fruits and vegetables such as a jam, marmalade, "syrup-zake" (fruit pickles) and "toka" (conserves); pickles and pickled products such as a "fukujin-zuke" (red colored radish pickles), "bettara-zuke" (a kind of whole fresh radish pickles), "senmai-zake" (a kind of sliced fresh radish pickles) and "rakkyo-zuke" (pickled shallots); premixes for pickles and pickled products such as a "takuan-zuke-no-moto" (a premix for pickled radish) and "hakusai-zake-no-moto" (a premix for fresh white rape pickles); meat products such as a ham and sausage; products of fish meat such as a fish ham, fish sausage, "kamaboko" (a steamed fish paste), "chikuwa" (a kind of fish paste) and "tenpura" (a Japanese deep-fat fried fish paste); "chinmi" (relish) such as a "uni-no-shiokara" (salted guts of sea urchin), "ika-no-shiokara" (salted guts of squid), "su-konbu" (processed tangle), "saki-surume" (dried squid strips), and "fuguno-mirin-boshi" (a dried mirin-seasoned swellfish); "tsukadani" (foods boiled down in soy sauce) such as those of layer, edible wild plant, dried squid, small fish, and shellfish; daily dishes such as a "nimame" (cooked beans), potato salad, and "konbu-maki" (a tangle roll); milk products; canned and bottled products such as those of meat, fish meat, fruit and vegetable; alcoholic beverages such as a synthetic sake, wine, liquor, and liqueur; soft drinks such as a coffee, cocoa, juice, carbonated beverage, sour milk beverage, and beverage containing a lactic acid bacterium; and instant food products such as an instant pudding mix, instant hot cake mix, "sokuseki-shiruco" (an instant mix of adzuki-bean soup with rice cake), and instant soup mix.

The present crystalline trehalose dihydrate can be also used in feeds and pet foods for animals such as domestic animals, poultry, honey bees, silk warms, and fishes to improve their taste preferences. The trehalose dihydrate can be arbitrary used as a sweetener, taste-improving agent, quality-improving agent in orally usable products including preferences, cosmetics, and pharmaceuticals in a solid, paste, and liquid form: Examples of such products are tobaccos, cigarettes, dentifrices, lipsticks, rouges, lip creams, internal medicines, troches, tablets, cod liver oils, cachous, oral refrigerants, and gargles.

The present crystalline trehalose dihydrate can be further used in soaps, skin creams, body shampoos, hair creams, lip sticks, skin-beautifying agents, and hair restores as a stabilizer, osmosis-pressure controlling agent, filler, moisture-controlling agent, viscosity-controlling agent, and quality-improving agent.

In addition, the present crystalline trehalose dihydrate can be used as a stabilizer for effective components and activities of biologically active substances including cytokines such as $\alpha$-, $\beta$- and $\gamma$-interferons, tumor necrosis factor-$\alpha$ (TNF-$\alpha$), tumor necrosis factor-$\beta$ (TNF-$\beta$), lymphotoxins, macrophage migration inhibitory factor, colony-stimulating factor, transfer factor, and interleukins 2, 12 and 18; hormones such as insulin, growth hormone, prolactin, erythropoietin, follicle-stimulating hormone, and adrenocorticotropic hormone, vaccines such as BCG vaccine, Japanese encephalitis vaccine, measles vaccine, live polio vaccine, smallpox vaccine, tetanus toxoid, Trimeresurus antitoxin, and human immunoglobulin; antibiotics such as penicillin, erythromycin, chloramphenicol, tetracycline, streptomycin, and kanamycin sulfate; vitamins such as thiamine, riboflavin, L-ascorbic acid, cod liver oil, carotenoid, ergosterol, and tocopherol; enzymes such as lipase, elastase, urokinase, protease, and glucanase; extracts such as ginseng extract, indigo plant extract, nandin extract, Chinese quince extract, snapping turtle extract, chlorella extract, propolis extract, and royal jelly extract; and viable microorganisms such as viruses, lactic acid bacteria, bifid bacteria, and yeasts. The present crystalline trehalose dihydrate can be also used in the preparation of pharmaceuticals as an osmosis-controlling agent, filler, excipient, diluent, intubation nutrition, or syrup. As described above, the methods to incorporate the present crystalline trehalose dihydrate into the above food products, cosmetics, and pharmaceuticals include conventional methods, for example, mixing, kneading, dissolving, melting, soaking, permeating, sprinkling, applying, coating, spraying, injecting, solidifying, and crystallizing. The amount of the crystalline trehalose dihydrate to be incorporated is in an amount of 0.1% or higher, and preferably 0.5% or higher, d.s.b. The compositions thus obtained can be widely used in food products, cosmetics, pharmaceuticals, and shaped bodies, as well as other daily goods, agricultural/forestry/fishery products, and chemical products.

The following experiments describe the present invention in more detail.

Experiment 1
Influence of the Trehalose Content on the Proportion of Length in the c Axis to that in the b Axis of Crystalline Trehalose Dihydrate Growing in Supersaturated Aqueous Trehalose Solution It was examined for the influence of the trehalose content on the proportion of the c axis to the b axis of crystalline trehalose dihydrate growing in a supersaturated aqueous trehalose solution. Using "TREHAOSE®", a high-purity crystalline trehalose dihydrate with a trehalose content of 98.6% commercialized by Hayashibara Shoji, Inc., Okayama, Japan; an aqueous trehalose solution with a trehalose content of 50%, d.s.b., was prepared. Using "TREHASTER®", a syrup containing starch-degraded saccharides and 30% trehalose commercialized by Hayashibara Shoji, Inc., Okayama, Japan, as an example of saccharides that are easily formed as by products when producing trehalose from starches, it was mixed with the above aqueous trehalose solution to prepare aqueous trehalose solutions with trehalose contents of 98.6, 83.3, and 68.1%. The resulting solutions were concentrated to give a supersaturation degree of 1.20 at 50° C., placed in a cylindrical rotatory crystallizer heated to 50° C., admixed with as a seed crystal a previously-recrystallized crystalline trehalose dihydrate powder with a purity of 99.9% in an amount of 2%, d.s.b., to the trehalose in each solution, heated to 60° C. under gentle-stirring conditions while partially dissolving the seed crystal, and cooled gradually to 40° C. over 2.5 hours. Then the crystalline trehalose dihydrates grown in each solutions were microscopically observed and photographed.

Figure 1:
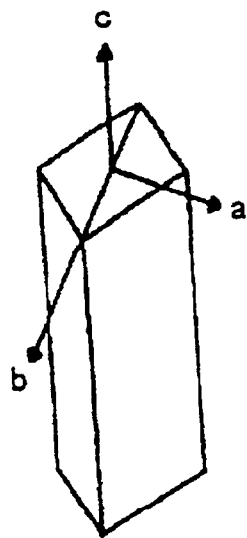
FIG. 1 is a schematic diagram of an orthorhombic crystalline trehalose dihydrate with different lengths of the a-, b-, and c-axes perpendicularly intersecting each other.
Figure 2:
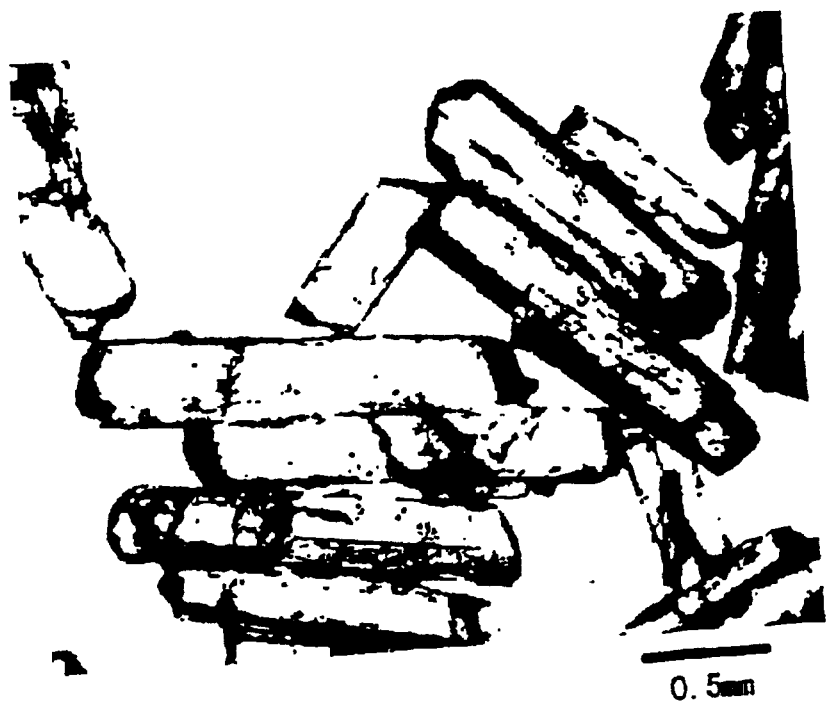
FIG. 2 is an intermediate tone view of a microscopic photograph of a commercially available crystalline trehalose dehydrate, displayed on a display.
Figure 3:
FIG. 3 is an intermediate tone view of a microscopic photograph of a crystalline trehalose dihydrate, grown in a supersaturated aqueous solution with a trehalose content of 98.8%, displayed on a display.

FIG. 3 is a photograph of a crystalline trehalose dihydrate for the aqueous trehalose solution with trehalose content of 98.6%; FIG. 4, one for the aqueous trehalose solution with a trehalose content of 83.3%; and FIG. 5, one for the aqueous trehalose solution with a trehalose content of 68.1%. Based on FIGS. 3, 4 and 5, the proportion of the c axis to the b axis was determined for each crystal by measuring the axes on major representative crystals. The results are tabulated in Table 1.

TABLE 1

| Trehalose content (%) | Proportion of the c axis to the b axis (c/b) |
|---|---|
| 98.6 | About 0.8 to about 1.9 |
| 83.3 | About 3.5 to about 5.5 |
| 68.1 | About 6.0 to about 12.0 |

As evident from the data of FIGS. 3, 4 and 5 and Table 1, polyhedral crystalline trehalose dihydrates, grown in supersaturated aqueous trehalose solutions, have a smaller proportion of the c axis to the b axis as the increase of trehalose content in the supersaturated solutions, revealing that crystalline trehalose dihydrates with the above proportion less than 2.0 are obtained from those with a trehalose content of at least about 98%.

Experiment 2
Filtration Test

Using the three types of aqueous solutions containing crystalline trehalose dehydrate, grown by the method in Experiment 1, the following filtration test was conducted by placing a filter paper No. 2, commercialized by Toyo Roshi Co., Ltd., Tokyo, Japan, on a Nutsche, 15 cm in diameter, and filtering 1,000 ml each of the solutions under suck conditions. As a result, it was found that the more the material supersaturated aqueous trehalose solution contains trehalose, the shorter the filtration time becomes and the more the filterability becomes preferable. This confirmed that the aqueous trehalose solution, containing an elongated crystalline trehalose dihydrate with a proportion of the c axis to the b axis of less than 2.0, is most satisfactorily separable.

Experiment 3
Influence of the Supersaturation Degree of Trehalose on the Formation of Minute Crystals during the Growth of Polyhedral Crystalline Trehalose Dihydrate With the aim of growing a polyhedral crystalline trehalose dihydrate having a uniform size as much as possible while preventing the formation of minute crystals susceptible to forming during the growth of the polyhedral crystalline trehalose dihydrate, it was examined for the influence of the supersaturation degree of trehalose in supersaturated trehalose solutions on the formation of the minute crystals. Using the commercialized high-purity crystalline trehalose dihydrate with a purity of 98.6% as used in Experiment 1, a 50% aqueous trehalose solution, d.s.b., was prepared and concentrated into solutions with supersaturation degrees of 1.05, 1.10, 1.15, 1.20, 1.25 and 1.30 at 50° C. The supersaturated solutions were respectively placed in a cylindrical rotatory crystallizer and admixed with as a seed crystal a crystalline trehalose dihydrate, having the proportion of the c axis to the b axis of less than 2.0 and having the c axis of about one millimeter, prepared by drying and sieving a crystal separated by the method in Experiment 2, in an amount of 0.5% to the trehalose in each supersaturated solution, d.s.b. Then the resulting solutions were gradually cooled under gentle stirring conditions to 40° C. at a cooling rate of 1° C. per 30 min over five hours, and controlled in such a manner that they should not exceed their respective supersaturation degrees of trehalose as mentioned above in order to grow the seed crystal to give a proportion of the c axis to the b axis of less than 2.0 and to give the c axis of about 3 to 4 mm. Under the conditions, it was examined whether minute crystals other than the growing seed crystal are newly formed and whether the grown crystals had substantially a uniform size. The results are tabulated in Table 2.

TABLE 2

| Starting supersaturation degree | Formation of minute crystal | Size of crystal |
|---|---|---|
| 1.05 | − | Roughly uniform |
| 1.10 | − | Roughly uniform |
| 1.15 | + | Various in size |
| 1.20 | ++ | Various in size |
| 1.25 | ++ | Various in size |
| 1.30 | +++ | Various in size |

Note: The symbols "+++", "++", "+" and "−" represent that additional minute crystals were quite easily formed, easily formed, formed, and scarcely formed, respectively.

As evident from the results in Table 2, it was revealed that additional minute crystals were easily formed in addition to the growing seed crystal, and the growing polyhedral crystalline trehalose dihydrate became varied in size when the supersaturation degree of trehalose was over 1.15. In other words, the results revealed that the forming crystalline trehalose dihydrate was grown mainly from the seed crystal without substantially forming minute crystals, and the growing polyhedral crystalline trehalose dihydrates had a roughly uniform size, a proportion of the c axis to the b axis of less than 2.0, and the c axis of about 3 to 4 mm when the supersaturation degree of trehalose was below 1.15, and preferably below 1.10. This can be quite advantageously applied for producing such an elongated polyhedral crystalline trehalose dihydrate.

Based on the results in Experiments 1 and 3, supersaturated aqueous trehalose solutions, which are preferably used to grow an elongated polyhedral crystalline trehalose dehydrate having a proportion of the c axis to the b axis of less than 2.0, are those which contain trehalose in an amount of at least about 98% or higher and which are preferably controlled under a supersaturation degree of below 1.15, and preferably below 1.10.

Experiment 4

Test on Physical Properties of Polyhedral Crystalline Trehalose Dihydrate

As a representative polyhedral crystalline trehalose dihydrate having the c axis of about 10 mm, obtained by the methods in the later described Examples A-1 and A-2, three specimens with a tetradodecahedral crystalline structure were used and examined for the crystallinity by powdery X-ray diffraction analysis and the intrusion disruptive strength by rheometer. The crystallinity was determined by pulverizing a specimen and applying the Ruland method in *Acta Crystallographica*, Vol. 14, p. 1,180 (1961) using "GEIGERFLEX RAD-IIB", an X-ray diffraction analyzer using Cuka ray commercialized by Rigaku Corporation, Tokyo, Japan, based on the powdery X-ray diffraction intensity. Using "FUDOH RHEO METER NRM-2010J-CW", a rheometer commercialized by Rheotech Co., Ltd., Tokyo, Japan; and a needle, about 3 mm in diameter, as an adaptor, the intrusion disruptive strength was determined by placing a polyhedral crystal on a specimen stage, elevating the stage to the direction of the needle at a rate of 6 cm/min, and measuring the strength (kg) when the needle intrudes into and ruptures the polyhedral crystal. As a control, commercially available crystal sugar with a size equivalent to those of the specimens was examined similarly as above. The results are tabulated in Table 3.

TABLE 3

| | Specimen | | |
|---|---|---|---|
| Item | Example A-1 | Example A-2 | Sugar crystal |
| Crystallinity (%) | 84  84  83 | 84  83  83 | 84  85  85 |
| Intrusion disruptive strength (kg) | 4.3  4.1  4.0 | 3.8  3.8  3.5 | 9.9  10.0  10.0 |

As evident from the results in Table 3, although the polyhedral crystalline trehalose dihydrates, obtained by the methods in Examples A-1 and A-2, had nearly the same crystallinity as the control sugar crystal, their intrusion disruptive strengths were lower than about half as much as the control, i.e., in the range of 3.5 to 4.3 kg. The level of such intrusion disruptive strengths of the trehalose dihydrates is sufficient for their processings, packagings, storages, and transportations; the energy needed for their disruption and pulverization can be lowered by a large margin as compared with the control crystal sugar.

Polyhedral crystalline trehalose dihydrate with an intrusion disruptive strength of 3.5 to 4.3 kg can be easily crushed even by the teeth of older and younger ages.

The following Examples A and B describe the preferred embodiments of the present process for producing crystalline trehalose dehydrate and the present process for producing compositions containing the crystal, respectively.

EXAMPLE A-1

Using a reagent grade high-purity crystalline trehalose with a trehalose content of 99.5% commercialized by Hayashibara Biochemical Laboratories, Inc., Okayama, Japan, a supersaturated aqueous trehalose solution with a trehalose concentration of about 55% at 40° C. was prepared, then the solution was placed in a cylindrical rotatory crystallizer preheated to the same temperature as above, admixed with as a seed crystal an about 0.2%, d.s.b., trehalose dihydrate with the c axis of about one millimeter as used in Experiment 3 to the trehalose in the solution, and gradually cooled under gentle stirring conditions to 35° C. over about 40 hours to keep the supersaturation degree not higher than 1.10, and to form polyhedral crystalline trehaloses with a proportion of the c axis to the b axis of about 0.7 to about 1.7, a proportion of the c axis to the a axis of about 1.5 to about 4.0, and the c axis of about 5 to about 10 mm. Thereafter, the resulting mixture was filtered to separate the crystals, and the crystals were dried to obtain polyhedral crystalline trehalose dihydrates in a yield of about 12% to the material reagent grade high-purity crystalline trehalose.

The products have a proportion of the c axis to the b axis of less than 2.0, a proportion of the c axis to the a axis of less than 5.0, a length of the c axis of about 5 to about 10 mm, and a deca- to icosa-hedral crystalline structure. Most of the products are, however, stable polyhedral crystalline trehalose dihydrates in a dodeca- to octodecimo-hedral crystalline structure, which can be easily filtered and dried without fracture during the drying and separation steps. The products do not substantially absorb moisture to be solidified and have a satisfactory free-flowing ability and handleability. With advantageous properties inherent to trehaose, the products can be used either directly or after colored, flavored, and pulverized in compositions such as food products, cosmetics, and pharmaceuticals as a sweetener, taste-imparting agent, quality-improving agent, stabilizer, filler, adjuvant, and/or excipient.

EXAMPLE A-2

Using "TREHAOSE®", a high-purity crystalline trehalose dehydrate with a trehalose content of 98.6% commercialized by Hayashibara Shoji, Inc., Okayama, Japan, an aqueous trehalose solution with a trehalose content of 60% at 50° C. was prepared, placed in a cylindrical rotatory crystallizer preheated to the same temperature as above, admixed with, as a seed crystal, crystalline trehalose dihydrate with the c axis of about five millimeters, obtained by the method in Example A-1, in an amount of about 2%, d.s.b., to the trehalose in the solution, and gradually cooled under gentle stirring conditions to 40° C. over about 64 hours to keep the supersaturation degree to 1.10 or lower, whereby growing a polyhedral crystalline trehalose with a proportion of the c axis to the b axis of about 1.1 to about 1.9, a proportion of the c axis to the a axis of about 1.5 to about 4.5, and the c axis of about 10 to about 20 mm. The resulting mixture was filtered to separate the crystals, and the separated crystals were dried to obtain a polyhedral crystalline trehalose dihydrates in a yield of about 15% to the material crystalline trehalose dihydrate.

The products have a proportion of the c axis to the b axis of lower than 2.0, a proportion of the c axis to the a axis of lower than 5.0, the c axis of about 10 to about 20 mm, and a deca- to icosa-hedral crystalline structure. Most of the products are stable polyhedral crystalline trehalose dihydrates with a dodeca- to octodecimo-hedral crystalline structure, which can be easily filtered and dried without fracture during the drying and separation steps. The products have an insubstantial hygroscopicity and solidification, satisfactory free-flowing ability and handleability, and the advantageous properties of trehaose per se; they can be arbitrarily used either intact or after colored, flavored, and pulverized in compositions such as food products, cosmetics, and pharmaceuticals as a sweetener, taste-imparting agent, quality-improving agent, stabilizer, filler, adjuvant, and/or excipient.

EXAMPLE B-1

Sweetener

A sweetener was prepared by mixing to homogeneity one part by weight of a crystalline trehalose dihydrate, obtained by the method in Example A-2, with 0.1 part by weight of an aqueous solution containing 0.01 part by weight of "ASPARTAME", L-aspartyl-L-phenyllaninemethylester commercialized by Ajinomoto Co., Ltd., Tokyo, Japan. The sweetener had a relatively-high sweetening power and quality and a polyhedral crystalline structure; the sweetening power was about 2-fold higher than that of sucrose, and the calorific value was about half as much as sucrose. The product can be suitably used as a low-caloric sweetener to sweeten low-calorific food products for fat persons and diabetics who restrict their calorie intake, and can be also used to sweeten food products with lesser inducibility of dental caries because the sweetener less induces acids by dental-caries-inducing microorganisms and less forms insoluble glucans.

EXAMPLE B-2

Sweetener 0.05 part by weight of a condensed lemon juice was homogeneously sprayed over one part by weight of a crystalline trehalose dihydrate, obtained by the method in Example A-1, to obtain a sweetener. The product is a lemon-flavored sweetener with a polyhedral crystalline structure, and can be used intact as a refreshment or confectionery, as well as a saccharide material for confectioneries or beverages including teas.

EXAMPLE B-3

Candy Fluff

A lemon-flavored sweetener with a polyhedral crystalline structure, obtained by the method in Example B-2, was subjected to a machine for producing candy fluff to obtain the captioned product. Unlike conventional candy fluff prepared with sugar, the product is an acidic, lemon flavored candy-fluff.

EXAMPLE B-4

Bread

One hundred part by weight of wheat flour, two parts by weight of a yeast five parts by weight of sugar, one part by weight of a crystalline trehalose dihydrate obtained by the method in Example A-2, and 0.1 part by weight of a yeast food were in a usual manner kneaded with water, and the mixture was fermented at 26° C. for two hours and further aged for 30 min. The resulting dough was rounded and shaped by hand. Five pieces of a crystalline trehalose dihydrate, obtained by the method in Example A-1, were partly inserted into each of the resulting shaped bodies and baked in a usual manner. The baked products with crystalline trehalose dihydrates on their surfaces are unique high-quality breads with a satisfactory color and internal texture, adequate elasticity, and mild sweetness.

EXAMPLE B-5

Cookie

Sixty parts by weight of butter, 20 parts by weight of sugar, 20 parts by weight of maltose, and 10 parts by weight of powdered a crystalline trehalose dihydrate obtained by the method in Example A-1 were sufficiently kneaded and further admixed with 40 parts by weight of fresh eggs to obtain a cream. The product was then admixed with 140 parts by weight of soft flour, 10 parts by weight of corn starch, and three parts by weight of pullulan into a cookie dough which was then placed in a container with a chrysanthemum-shaped cap, shaped into flower-shaped bodies by pressing out through the cap and placing on a plate, adhered with a polyhedral crystalline trehalose dihydrate obtained by the method in Example A-1, and baked at 170° C. for 15 min by an oven. In the product, both the crystalline trehalose dihydrate and the cookie dough were well bound each other without separation, and the product had a satisfactory flavor, taste, and mouth feel.

EXAMPLE B-6

Ume Brandy

Using 10 parts by weight of fresh umes (a Japanese apricot) and a polyhedral crystalline trehalose dihydrate obtained by the method in Example A-2, the apricots and the crystal were placed alternatively in a container used for preparing ume brandy. Into the container was slowly poured 10 parts by weight of shochu (Japanese spirits distilled from sweet potatoes, rice, etc.) and 1.5 parts by weight of a sweet sake in such a manner that the shochu and the sweet sake did not dissolve the crystals as much as possible, then the container was capped and allowed to stand for one year under cooling and dark conditions to obtain a ume brandy. The product has a satisfactory color tint, mouth feel, flavor, and taste.

[Effect of the Invention]

As described above, the present crystalline trehalose dihydrate, which has an elongated crystal structure with a proportion of the c axis to the b axis of less than 2.0, is a stable crystal which can be easily separated and dried in its processing without fracture throughout the drying and sieving steps. Since the trehalose dihydrate has insubstantial hygroscopicity and solidification and has a satisfactory free-flowing ability and handleability, it can minimize the physical and labor costs needed for controlling packagings, transportations, and storages. The present crystalline trehalose dihydrate has the properties of trehalose per se, for example, a satisfactory water-solubility, low-sweetness, body-imparting ability, gloss-imparting ability, moisture-retaining ability, viscosity, stability, heat tolerance, acid tolerance, retrogradation-preventing ability for starches, calorie-supplementing ability, insubstantial fermentability, and low-dental-caries-inducibility. Because of these properties, the present crystalline trehalose dihydrate can be arbitrarily used in compositions such as food products, cosmetics, and pharmaceuticals which need the properties. The establishment of the present crystalline trehalose dihydrate, its preparation and uses would greatly influence on the fields of food products, cosmetics, pharmaceuticals, and shaped bodies, as well as other fields of daily goods; agricultural-, forestry-, and fishery-products; and chemicals.

While there has been described what is at present considered to be the preferred embodiments of the invention, it will be understood the various modifications may be made therein, and it is intended to cover the appended claims all such modifications as fall within the true spirits and scope of the invention.

What is claimed is:

1. A process for producing crystalline trehalose dihyrdrate having an elongated crystalline structure with a proportion of the length in the c axis to that in the b axis being less than 2.0, which process comprises:

placing in a crystallizer a supersaturated aqueous trehalose solution with a trehalose content of at least 98 w/w %, on a dry solid basis;

coexisting a crystalline trehalose dihydrate as a seed crystal;

growing the crystalline trehalose dihydrate by cooling the mixture gradually to control the supersaturation degree to a level of less than 1.15; and separating and drying the resulting mixture to collect the grown crystalline trehalose dihydrate.

2. The process of claim 1, wherein said crystallizer is a cylindrical rotatory crystallizer, and said growing and cooling is carried out under rotatory motion.

3. The process of claim 1, wherein the growing step of crystalline trehalose dihydrate is carried at a temperature of about 20 to about 90° C.

4. In a process for producing a sweetener, a candy fluff, a baked confectionary, or an alcoholic beverage with fruit, comprising incorporating a first component into a material product, the improvement wherein said first component is a crystalline trehalose dihydrate produced according to claim 1.

5. A process for producing a composition, which process comprises incorporating a crystalline trehalose dihydrate having an elongated crystalline structure with a proportion of the length in the c axis to that in the b axis of less than 2.0, and with a length in the c axis of at least 3 mm, into a material product, wherein said crystalline trehalose dehydrate is producible by:

placing in a crystallizer a supersaturated aqueous trehalose solution with a trehalose content of at least 98 w/w %, on a dry solid basis;

coexisting a crystalline trehalose dihydrate as a seed crystal;

growing the crystalline trehalose dihydrate by cooling the mixture gradually to control the supersaturation degree to a level of less than 1.15; and separating and drying the resulting mixture to collect the grown crystalline trehalose dihydrate.

6. A method for growing crystalline trehalose dihydrate which has an elongated crystalline structure with a proportion of the length of the c axis to that of the b axis being less than 2.0, the c axis having a length of at least 3 mm, which process comprises:

placing in a crystallizer a supersaturated aqueous trehalose solution with a trehalose content of at least 98 w/w %, on a dry solid basis;

coexisting a crystalline trehalose dihydrate as a seed crystal; and growing the crystalline trehalose dihydrate by cooling the mixture gradually to control the supersaturation degree to a level of less than 1.15.

7. The method of claim 6, wherein an about 0.01 to about 20 w/w % of said crystalline trehalose dehydrate, on a dry solid basis, is used as the seed crystal to the trehalose in the supersaturated aqueous trehalose solution, and said seed crystal has an elongated crystalline structure with a proportion of the length in the c axis to that in the b axis being less than 2.0.

* * * * *